United States Patent [19]
Drake

[11] 3,898,268
[45] Aug. 5, 1975

[54] PREPARATION OF UNSATURATED NITRILES USING A BORON OXIDE PROMOTER

[75] Inventor: Charles A. Drake, Bartlesville, Okla.

[73] Assignee: Phillips Petroleum Company, Bartlesville, Okla.

[22] Filed: July 26, 1973

[21] Appl. No.: 382,901

[52] U.S. Cl. ............ 260/465.9; 260/465 K; 260/464
[51] Int. Cl. ................. C07c 121/02; C07c 121/30; C07c 121/48
[58] Field of Search .............. 260/465.9, 465 K, 464

[56] References Cited
UNITED STATES PATENTS
2,641,607  6/1953  Albisetti, Jr. et al. ........ 260/465.9 X
3,595,901  7/1971  Smith .............................. 260/465.9

OTHER PUBLICATIONS
Borisova et al., C.A. 59, page 1466, (1963).
Dzis'ko et al., C.A. 55, page 9008, (1961).

Primary Examiner—Joseph P. Brust

[57] ABSTRACT

A boron oxide promotes the reaction of an olefin and an unsaturated nitrile, such as the formation of a monoadduct product used as an intermediate in the production of di-nitriles. The boron oxide process increases product yield. Employing a saturated nitrile as reaction diluent helps reduce polymer build-up on the walls of the reaction vessel, and further improves product yield.

25 Claims, No Drawings

PREPARATION OF UNSATURATED NITRILES USING A BORON OXIDE PROMOTER

FIELD OF THE INVENTION

The invention relates to the preparation of unsaturated nitriles. In another aspect, the invention relates to the reaction of an olefin and an unsaturated nitrile.

BACKGROUND OF THE INVENTION

Various methods have been known to prepare unsaturated nitriles. Such methods include the reaction of an unsaturated organic halide with a metal cyanide; or the reaction of an unsaturated carbocyclic compound with a nitrile such as acrylonitrile, such as in the presence of an olefin catalyst; or the reaction of low molecular weight unsaturated nitrile with monoolefins, promoted, for example, by a phosphine. In some cases, starting materials have been difficult to obtain, or the yield has not been entirely satisfactory, or the course of the reaction has resulted in relatively high molecular weight adducts with consequent tendencies toward polymer build-up on the walls of the reaction vessel.

OBJECTS OF THE INVENTION

It is an object of the invention to provide a process to prepare unsaturated nitriles by the reaction of a monoolefin with an unsaturated nitrile with effective yields. It is another object to process a process to react an unsaturated nitrile with a monoolefin with minimal heavies production. A further object is the reduction of heavies build-up on reactor walls in the reaction of an unsaturated nitrile with a monoolefin.

Other aspects, objects and the several advantages of my invention will be apparent to one skilled in the art from a persual of the following description and my appended claims.

BRIEF SUMMARY OF THE INVENTION

A boron oxide is used as a promoter in the reaction of a monoolefin and an unsaturated nitrile. The monoolefin and unsaturated nitrile form a monoadduct product which can be used as an intermediate in the production of dinitriles. The boron oxide promoter increases the production yield. Conducting the process in the presence of a saturated nitrile diluent further improves yield and reduces polymer or heavies, thus reducing polymer buildup on the walls of the reaction vessel.

DETAILED DESCRIPTION OF THE INVENTION

I have discovered that the presence of a boron oxide promoter, and preferably the further presence of saturated nitriles as solvent, increases the yields of monoadducts in the preparation of unsaturated nitriles having a greater number of carbon atoms than the unsaturated nitrile starting material by the reaction of a monoolefin with an unsaturated nitrile reactant or starting material. At the same time, my process tends to suppress the formation of undesired higher molecular weight adducts, thus avoiding or preventing polymeric build-up or "varnish" on the surfaces of the reactor.

CATALYST

The promoter that I employ is described generically as a boron oxide. The generic term includes boric oxide or boron trioxide $B_2O_3$, metaboric acid $HBO_2$, orthoboric acid or boric acid or boracic acid $H_3BO_3$, and tetraboric acid or pyroboric acid $H_2B_4O_7$, any of these alone, or in admixture. Presently preferred is the orthoboric acid $H_3BO_3$.

The boron oxide, as I use the term generically to include any of those discussed above, preferably is employed in a finely divided state with an average particle size in the range of about 100 mesh or less. Either the anhydrous forms or those containing water of crystallization can be used. Carriers or diluents can be employed, if desired, such as silica, silica-alumina, kieselguhr, pumice, titania, zirconia, or the like.

SOLVENT

The reaction of the monoolefin with the unsaturated nitrile reaction is conducted with the promoter described above, and preferably conducted in a solvent suitable to give a high yield of desired monoadduct with minimum polymer formation.

The solvents are saturated nitriles which can be represented by RCN in which R represents a hydrocarbon paraffinic radical of up to 10 carbon atoms, which can be straight or branched, or cycloaliphatic. Such saturated nitriles include acetonitrile, propionitrile, 2-methyl propionitrile, adiponitrile, 2,3-dimethyl octyl nitrile, and the like.

MONOOLEFIN

The monoolefin unsaturated reactant is a hydrocarbon monoolefin, preferably of up to 12 carbon atoms per molecule, in which the double bond linkage can be either in the one position or as an internal double bond. These monoolefins can be represented by the general formula:

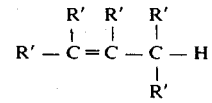

in which each R' is independently selected from hydrogen, alkyl, cycloalkyl, aryl, or combination hydrocarbon radicals, such that the total molecule contains a minimum of 3 carbon atoms per molecule.

Presently preferred are those monoolefinic hydrocarbons of 3 to 12 carbon atoms, and more preferred are those having an alkyl group, preferably methyl, as a side chain attached to at least one of the carbon atoms comprising the ethylenic linkage.

Exemplary species include propylene, 2-methylpropene, 3,4,4-trimethylpentene-2, 2,3-dimethylbutene-2, 2-butene, 1-pentene, 1-decene, cyclohexene, triisobutylene, and the like, including mixtures.

UNSATURATED NITRILE

The unsaturated nitriles which can be employed in the practice of my invention are those hydrocarbon nitriles containing ethylenic unsaturation, at least one hydrogen atom attached to a doubly-bonded carbon atoms, and at least one cyano group attached to a carbon atom adjacent to and doublybonded to the carbon atom containing at least one hydrogen atom. Illustrative unsaturated nitrile reactants are those represented by the formula

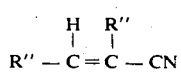

in which each R'' is independently selected from the group consisting of hydrogen, alkyl, cycloalkyl, and aryl hydrocarbyl radicals or combinations thereof, such as alkylcycloalkyl, cycloalkylalkyl, aralkyl and arylcycloalkyl radicals. Preferably the total number of carbon atoms in the nitrile reactant is within the range of 3 to 18, more preferably 3 to 8. Examples of unsaturated nitriles meeting the requirements of the above formula are acrylonitrile, 2-butenenitrile, 2-hexenenitrile, 5-methyl-2-hexenenitrile, 4-methyl-2-heptenenitrile, 6,6,8,8-tetramethyl-2-nonenenitrile, 6-cyclohexyl-2-octenenitrile, 6-phenyl-2-decenenitrile, 2-octadecenenitrile, 6,7,8-trimethyl-9-phenyl-2-nonenenitrile, and the like and mixtures thereof.

REACTION CONDITION

Any suitable mole ratio of olefin to unsaturated nitrile reactant can be employed in the practice of my invention. For example, olefin to nitrile mole ratios can vary from such as about 2:1 to 10:1, preferably from about 4:1 to about 6:1. Excess amounts of a reactant can be separated and recycled, if desired.

The reaction time can vary widely, e.g., from a few seconds to several hours, though presently preferably within a range of about 30 minutes to 6 hours. Reaction conditions include reaction temperatures and pressures suitable for the reaction, the reactants, and the product. Any suitable reaction temperature can be employed in the practice of my invention. Exemplary reaction temperatures include temperatures within the range of about 100° to 400° C., presently preferred about 200° C. to 300° C. Any suitable reaction pressure can be employed. Exemplary reaction pressures include pressures within the range of about atmospheric to 10,000 psig, presently preferably about 1,000 to 4,000 psig.

The amount of promoter that can be employed in my invention can vary widely, so long as sufficient is present to provide the desired improvement in yield, reduction in heavies, or both. As exemplary, I recommend a mole ratio of promoter to nitrile reactant of about 0.01:1 to 1:1, presently preferably about 0.02:1 to 0.5:1, more preferably about 0.05:1 to 0.1:1, exclusive of carrier, if any.

If desired, the process of this invention can be carried out in the presence of a polymerization inhibitor. The use of an inhibitor can be advantageous as limiting side reactions such as the oligomerization of the unsaturated nitrile. When an inhibitor is employed, a suitable amount exemplarily can be about 0.001 to about 5, preferably about 0.1 to about 1, percent by weight inhibitor based on weight of unsaturated nitrile reactant employed. Suitable inhibitors include hydroquinone, 2,6-di-tert-butyl-para-cresol, 2,6-di-tert-butylhydroquinone, 4-tert-butyl-catechol, para-hydroxydiphenylamine, and the like, and mixtures.

The resulting unsaturated nitrile reaction product, frequently termed a monoadduct, can be readily isolated from the reaction mixture by any convenient product recovery means or method, such as fractional distillation or crystallization. The reaction of unsaturated mononitrile reactant with hydrocarbon monoolefin such as acrylonitrile and isobutylene, does not provide only a single, simple unsaturated nitrile.

EXAMPLES

Runs provided are designed to assist a further understanding of my invention. Particular species employed, amounts, ratios, are intended to be illustrative, without limiting the reasonable scope of my invention.

EXAMPLE

Acrylonitrile, 80 g, and adiponitrile, 150 g, were placed in a 1-liter reactor. The system was flushed with nitrogen, and isobutylene, 320 g, added. The reactor and contents were heated for 1 hour at about 280° C. while maintaining about 2,600 psig. The resulting mixture was distilled and the product recovered. Conversion for this Run 1 based on acrylonitrile fed was 69 percent, with a product yield of 65 percent. Analysis of the product mixture by gas liquid chromatography indicated the product to be 5-methyl-5-hexene nitrile (92%), 2,4-dimethyl-4-pentene nitrile (8%). Ratio of product to heavies was about 5.1:1.

A further run was made, Run 2, employing the same materials, amounts, and conditions as described above, except further employing 10 g boric acid as promoter, adding the promoter to the reactor at the same time as the acrylonitrile. Otherwise, reaction conditions and work-up were the same. Examination of the reaction product indicated acrylonitrile conversion of 74 percent, with a yield of 69 percent. Ratio of products:heavies was about 5.2:1.

Comparison of Run 2, made according to one aspect of my invention, against Run 1, indicates an improvement in conversion by the use of the boron oxide promoter of 7 percent, an improvement in yield of 6 percent, and some improvement in ratio of product to heavies.

In another run, Run 3, 80 g of acrylonitrile, 50 g of acetonitrile, and 320 g isobutylene, were used. Reaction temperature was about 270°C., and the reaction interval about 1 hour. Otherwise, conditions were as described in Run 1 above. Conversion of acrylonitrile in Run 3 was 66 percent, but the yield of product was only 52 percent. Ratio of product:heavies was 3.7:1.

In Run 4, the same amounts of materials including unsaturated nitrile diluent and conditions as described in Run 3 were used, except that the reaction temperature was about 280° C., and a promoter was used, 10 g of boric acid. In this Run 4, made according to one aspect of my invention, conversion of acrylonitrile was 61 percent, with a yield of 73 percent, and the ratio product:heavies was 7.4:1. Thus, the combination of promoter and solvent resulted in good conversion, highly satisfactory yield, with much improved ratio of product:heavies, the amount of heavies diminishing sharply.

The acrylonitrile employed in the runs included a polymerization inhibitor, 0.1 percent hydroquinone.

The polymeric build-up on the reactor surfaces, usually observed with other solvents and catalysts, was nil in Runs 1, 2 and 4. In addition, the yields in Runs 2 and 4 were improved. Run 4 was particularly satisfactory because more of the acrylonitrile was converted to product and much less into heavies. The lack of polymer build-up and the increased product yield make the combination of saturated nitrile solvent and the boron oxide promoter particularly attractive.

The monoadduct unsaturated nitriles produced by the process of this invention are utilized as intermediates in the production of di-nitriles which when reduced to the corresponding amines are used in the manufacture of polyamides.

Reasonable variations and modification of my invention are possible within the scope of my disclosure without departing from the scope and spirit thereof as disclosed in this specification and claims.

I claim:

1. A process which comprises reacting under reaction conditions a hydrocarbon monoolefinic compound of at least 3 carbon atoms per molecule wherein the sole aliphatic unsaturation is olefinic with an ethylenically unsaturated hydrocarbon nitrile reactant of at least 3 carbon atoms per molecule wherein the sole aliphatic unsaturation is ehtylenic in the presence of an effective amount of a catalyst consisting essentially of boric oxide $B_2O_3$, metaboric acid $HBO_2$, orthoboric acid $H_3BO_3$, pyroboric acid $H_2B_4O_7$, or mixture, wherein said reaction conditions including time, pressure, and temperature in the range of about 100° to 400°C. are effective for said reacting, thereby preparing an unsaturated mononitrile product of higher number of carbon atoms than said unsaturated nitrile reactant.

2. The process according to claim 1 wherein said hydrocarbon monoolefinic compound can be represented by the formula

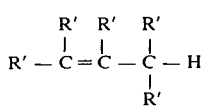

wherein each R' is independently selected from the group consisting of hydrogen, alkyl, cycloalkyl, aryl, and combination hydrocarbon radicals.

3. The process according to claim 2 wherein said ethylenically unsaturated nitrile reactant is further characterized as containing at least one hydrogen atom attached to a doubly-bonded carbon atom, and at least one cyano group attached to a carbon atom adjacent to and doubly-bonded to the carbon atom containing at least one hydrogen atom.

4. The process according to claim 3 wherein said ethylenically unsaturated nitrile reactant can be represented by

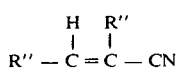

wherein each R'' is independently selected from the group consisting of hydrogen, alkyl, cycloalkyl, aryl, and combination hydrocarbon radicals.

5. The process according to claim 4 wherein said olefinic reactant contains 3 to 12 carbon atoms per molecule, and said unsaturated nitrile reactant contains 3 to 18 carbon atoms per molecule.

6. The process according to claim 5 employing said catalyst in a mole ratio of about 0.01:1 to 1:1 based on unsaturated nitrile reactant, and employing a mole ratio of monoolefin reactant to said unsaturated nitrile reactant in the range of about 2:1 to 10:1.

7. The process according to claim 6 wherein said reaction conditions include a reaction temperature in the range of about 200° to 300°C., and a pressure of about atmospheric to 10,000 psig.

8. A process according to claim 7 wherein the reaction is conducted for a time of about 30 minutes to 6 hours.

9. The process according to claim 8 wherein said hydrocarbon monoolefinic reactant is isobutylene, said ethylenically unsaturated hydrocarbon nitrile reactant is acrylonitrile, and said catalyst is said orthoboric acid $H_3BO_3$.

10. A method which comprises reacting under reaction conditions a hydrocarbon monoolefinic compound of at least 3 carbon atoms per molecule wherein the sole aliphatic unsaturation is olefinic with an ethylenically unsaturated hydrocarbon nitrile reactant of at least 3 carbon atoms per molecule wherein the sole aliphatic unsaturation is ethylenic in the presence of an effective amount of a catalyst consisting essentially of boric oxide $B_2O_3$, metaboric acid $HBO_2$, orthoboric acid $H_3BO_3$, tetraboric acid $H_2B_4O_7$, or mixture, under reaction conditions effective for said reacting including a reaction temperature in the range of about 100° to 400°C. and employing a diluent comprising a saturated paraffinic nitrile, or adiponitrile, thereby preparing an unsaturated mononitrile product of higher number of carbon atoms than said ethylenically unsaturated hydrocarbon nitrile reactant.

11. The method according to claim 10 wherein said hydrocarbon monoolefinic compound can be represented by the formula

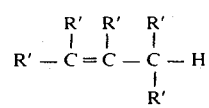

wherein R' is independently selected from the group consisting of hydrogen, alkyl, cycloalkyl, aryl, and combination hydrocarbon radicals.

12. The method according to claim 11 wherein said ethylenically unsaturated nitrile reactant is further characterized as containing at least one hydrogen atom attached to a doubly-bonded carbon atom, and at least one cyano group attached to a carbon atom adjacent to and doubly-bonded to the carbon atom containing at least one hydrogen atom.

13. The method according to claim 12 wherein said unsaturated nitrile reactant can be represented by

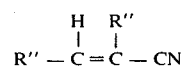

wherein each R'' is independently selected from the group consisting of hydrogen, alkyl, cycloalkyl, aryl, and combination hydrocarbon radicals.

14. The method according to claim 13 wherein said olefinic reactant contains 3 to 12 carbon atoms per molecule, and said unsaturated nitrile reactant contains 3 to 18 carbon atoms per molecule.

15. The method according to claim 14 wherein said saturated paraffinic nitrile diluent can be represented by RCN wherein R is a paraffinic radical.

16. The method according to claim 15 wherein said R contains up to 10 carbon atoms.

17. The method according to claim 16 wherein said solvent is acetonitrile, pripionitrile, 2-methylpropionitrile, adiponitrile, 2,3-diethyloctonitrile, or mixture.

18. The method according to claim 14 employing said promoter in a mole ratio of about 0.01:1 to 1:1 based on unsaturated nitrile reactant, and employing a mole ratio of said monoolefin reactant to said unsaturated nitrile reactant in the range of about 2:1 to 10:1.

19. The method according to claim 18 wherein said reaction conditions include a reaction temperature in the range of about 200° to 300°C., and a pressure of about atmospheric to 10,000 psi.

20. A method according to claim 19 wherein the reaction is conducted for a time of about 30 minutes to 6 hours.

21. The method according to claim 19 wherein said hydrocarbon monoolefinic reactant is isobutylene, said ethylenically unsaturated hydrocarbon nitrile reactant is acrylonitrile, said catalyst is said orthoboric acid $H_3BO_3$, and said diluent is said paraffinic nitrile diluent and is acetonitrile.

22. A process wherein a hydrocarbon monoolefinic compound is reacted with an ethylenically unsaturated hydrocarbon nitrile reactant under reaction conditions employing an effective amount of a catalyst consisting essentially of boric acid $B_2O_3$, metaboric acid $HBO_2$, orthoboric acid $H_3BO_3$, pyroboric acid $H_2B_4O_7$, or mixture, thereby preparing an unsaturated mononitrile product of higher number of carbon atoms than said ethylenically unsaturated hydrocarbon nitrile reactant wherein said unsaturated mononitrile product is the monoadduct addition of said hydrocarbon monoolefinic compound to said ethylenically unsaturated hydrocarbon nitrile reactant, wherein is employed a ratio of said hydrocarbon monoolefinic compound to said ethylenically unsaturated hydrocarbon nitrile reactant in the mole ratio range of about 2:1 to 10:1, a mole ratio of said catalyst to said nitrile reactant of about 0.01:1 to 1:1, and wherein said reaction conditions include a reaction time of about 30 minutes to 6 hours, a reaction temperature in the range of about 100° to 400°C., and a reaction pressure in the range of about atmospheric to 10,000 psig;

wherein said hydrocarbon monoolefinic compound is represented by the formula:

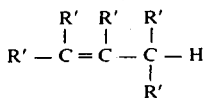

wherein each R' is independently selected from the group consisting of hydrogen, alkyl, cycloalkyl, aryl, and combination hydrocarbon radical, and said hydrocarbon monoolefinic compound contains 3 to 12 carbon atoms per molecule;

wherein said ethylenically unsaturated hydrocarbon nitrile reactant is represented by the formula:

wherein each R'' is independently selected from the group consisting of hydrogen, alkyl, cycloalkyl, aryl, and combination hydrocarbon radicals, and said ethylenically unsaturated nitrile hydrocarbon reactant contains 3 to 18 carbon atoms per molecule.

23. The process according to claim 22 wherein said hydrocarbon monoolefinic compound is isobutylene; said ethylenically unsaturated hydrocarbon nitrile reactant is acrylonitrile; said catalyst is said orthoboric acid $H_3BO_3$; and wherein said unsaturated mononitrile product is a mixture of 5-methyl-5-hexene nitrile and 2,4-dimethyl-4-pentene nitrile.

24. A process wherein a hydrocarbon monoolefinic compound is reacted with an ethylenically unsaturated hydrocarbon nitrile reactant under reaction conditions employing an effective amount of a catalyst consisting essentially of boric oxide $B_2O_3$, metaboric acid $HBO_2$, orthoboric acid $H_3BO_3$, pyroboric acid $H_2B_4O_7$, or mixture, thereby preparing an unsaturated mononitrile product of higher number of carbon atoms than said ethylenically unsaturated hydrocarbon nitrile reactant wherein said unsaturated mononitrile product is the monoadduct addition of said hydrocarbon monoolefinic compound to said ethylenically unsaturated hydrocarbon nitrile reactant, wherein is employed a ratio of said hydrocarbon monoolefinic compound to said ethylenically unsaturated hydrocarbon nitrile in the mole ratio range of about 2:1 to 10:1, a mole ratio of said catalyst to said nitrile reactant of about 0.01:1 to 1:1, and wherein said reaction conditions include a reaction time of about 30 minutes to 6 hours, a reaction temperature in the range of 100° to 400°C., a reaction pressure in the range of about atmospheric to 10,000 psig, and wherein said reaction is conducted in the presence of a saturated hydrocarbon nitrile solvent selected from the group consisting of RCN wherein R is a hydrocarbon paraffinic radical of up to 10 carbon atoms and adiponitrile;

wherein said hydrocarbon monoolefinic compound is represented by the formula:

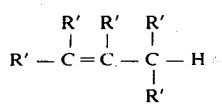

wherein each R' is independently selected from the group consisting of hydrogen, alkyl, cycloalkyl, aryl, and combination hydrocarbon radicals, and said hydrocarbon monoolefinic compound contains 3 to 12 carbon atoms per molecule, wherein said ethylenically unsaturated hydrocarbon nitrile reactant is represented by the formula:

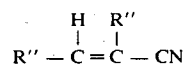

wherein each R'' is independently selected from the group consisting of hydrogen, alkyl, cycloalkyl, aryl, and combination hydrocarbon radicals, and said ethylenically unsaturated hydrocarbon nitrile reactant contains 3 to 18 carbon atoms per molecule.

25. The process according to claim 24 wherein said hydrocarbon monoolefinic compound is isobutylene; said ethylenically unsaturated hydrocarbon nitrile reactant is acrylonitrile; said boron oxide catalyst is said orthoboric acid $H_3BO_3$; said solvent is said adiponitrile; and wherein said unsaturated mononitrile product is a mixture of 5-methyl-5-hexene nitrile and 2,4-dimethyl-4-pentene nitrile.

* * * * *

UNITED STATES PATENT AND TRADEMARK OFFICE
CERTIFICATE OF CORRECTION

PATENT NO. : 3,898,268
DATED : August 5, 1975
INVENTOR(S) : Charles A. Drake

It is certified that error appears in the above-identified patent and that said Letters Patent are hereby corrected as shown below:

Column 5, claim 1, line 12, "ehtylenic" should be --- ethylenic ---;

Column 6, claim 11, line 32, after "wherein" and before "R" insert --- each ---; and Column 6, claim 17, line 62, "pripionitrile," should be --- propionitrile, ---.

Signed and Sealed this twenty-seventh Day of January 1976

[SEAL]

Attest:

RUTH C. MASON
Attesting Officer

C. MARSHALL DANN
Commissioner of Patents and Trademarks